July 3, 1962

C. G. REYNARD 3,042,267

LIQUID DISPENSING DEVICE

Filed May 19, 1958

INVENTOR.
CHAUNCY G. REYNARD
BY
Charles S. Penfold
ATTORNEY

July 3, 1962     C. G. REYNARD     3,042,267
LIQUID DISPENSING DEVICE

Filed May 19, 1958     2 Sheets-Sheet 2

INVENTOR.
CHAUNCY G. REYNARD
BY
Charles S. Penfold
ATTORNEY

United States Patent Office 3,042,267
Patented July 3, 1962

3,042,267
LIQUID DISPENSING DEVICE
Chauncy G. Reynard, Fort Wayne, Ind., assignor to C. G. Reynard Inc., Fort Wayne, Ind., a corporation of Indiana
Filed May 19, 1958, Ser. No. 736,043
13 Claims. (Cl. 222—185)

The invention relates generally to liquid dispensing means and more particularly is directed to improvements in a dispenser for a liquid such as milk.

In recent years there has been a trend in the sale of milk in large glass containers or bottles of the gallon and half gallon size for home consumption. The weight of these filled containers is such that it is quite awkward or inconvenient to lift and place them on a relatively high refrigerator shelf or mounting and safely remove them therefrom.

While the foregoing in mind, the purpose of the subject invention is to provide a support which may be readily attached to the outlet or neck end of a bottle or jug while the bottle is in an upright position, after which the support and bottle as a unit may be placed on a refrigerator shelf or other mounting in an inverted position from which the milk may be conveniently released by an improved control as needed without removing the bottle from the shelf until its contents are gone.

More particularly, an object of the invention is to provide a supporting assembly comprising a support or base with a socket or chamber for receiving the open end portion of a bottle, and a pair of passages for communication with the interior of the bottle, including a unique control or valve device which may be manipulated to release the milk or other fluid in the bottle through one of the passages and afford a venting of the bottle above the level of the milk through the other passage so that the milk or any other fluid therein will be readily released at a uniform rate of flow.

A specific object of the invention is to provide a support in which the passages above referred to are open ended and arranged to facilitate cleaning thereof.

An important object of the invention is to provide a control device in the form of a subassembly or unit which can be readily detachably connected to the support in a unique manner for operation adjacent the outer ends of the passages for simultaneously controlling the release of the milk and venting the bottle. This control is provided with a handle which is preferably located in a rearwardly extending position so that it cannot be accidentally actuated by a refrigerator door when the latter is closed.

Also, an object of the invention is to provide a plug unit which is detachably connected to the support adjacent the inner ends of the passages for normally closing them.

Another object of the invention is to provide a support which is provided with a pair of openings, one of which establishes communication between the chamber or socket and the passage through which the liquid is dispensed and the other of which communicates with the passage utilized for venting and serves to receive the lower end of a lower tube constituting a component of a venting device.

Another object of the invention is to provide a readily removable venting device which is comprised of the lower tube above referred to, an upper tube telescopically mounted in the lower tube so that the device may be adjusted to various heights for different sized containers, and a seal to prevent passage of a liquid therebetween, with a notch or notches in the upper end of the upper tube so as to insure venting when the upper tube engages the end of a container.

Other objects of the invention reside in providing a supporting assembly which, among other things, includes a central body portion provided with the socket or chamber, above referred to, unique means for sealing the end portion of the bottle in the socket, an annular portion concentrically arranged about the body portion, a plurality of radial portions joining the body portion and annular portion of which one radial portion is enlarged and provided with the pair of passages, above referred to, and a pressure or clamping ring which serves to clamp a seal or gasket about the end portion of the bottle and against the socket for firmly detachably securing the bottle in place against leakage of its contents.

Another object of the invention is to provide a unique sealing or gasket means so that the open end portions of bottles of different sizes may be readily secured in the socket, including an organization whereby the liquid is completely sealed within the confines of a bottle and/or the supporting assembly without coming in contact with any metal parts.

Further objects of the invention reside in providing a supporting assembly in which all of its components are constructed of materials which are tasteless, odorless, acid resistant and will withstand temperatures within at least a range of 218 to 225 degrees Fahrenheit so that the assembly may be sterilized to comply with the rules and regulations set up by boards of health.

Additional attributes of the invention reside in providing a dispensing device which is efficient, durable and comprised of a minimum number of components or parts which can be economically manufactured and assembled and readily cleaned.

Other objects and advantages of the invention will become apparent after the description hereinafter set forth is considered in conjunction with the drawings annexed hereto.

In the drawings:

FIGURE 7 is a partial top view of a portion of the supporting assembly showing the control device, partly in section, operatively associated with the passages above referred to;

Figures 1, 2, 3:
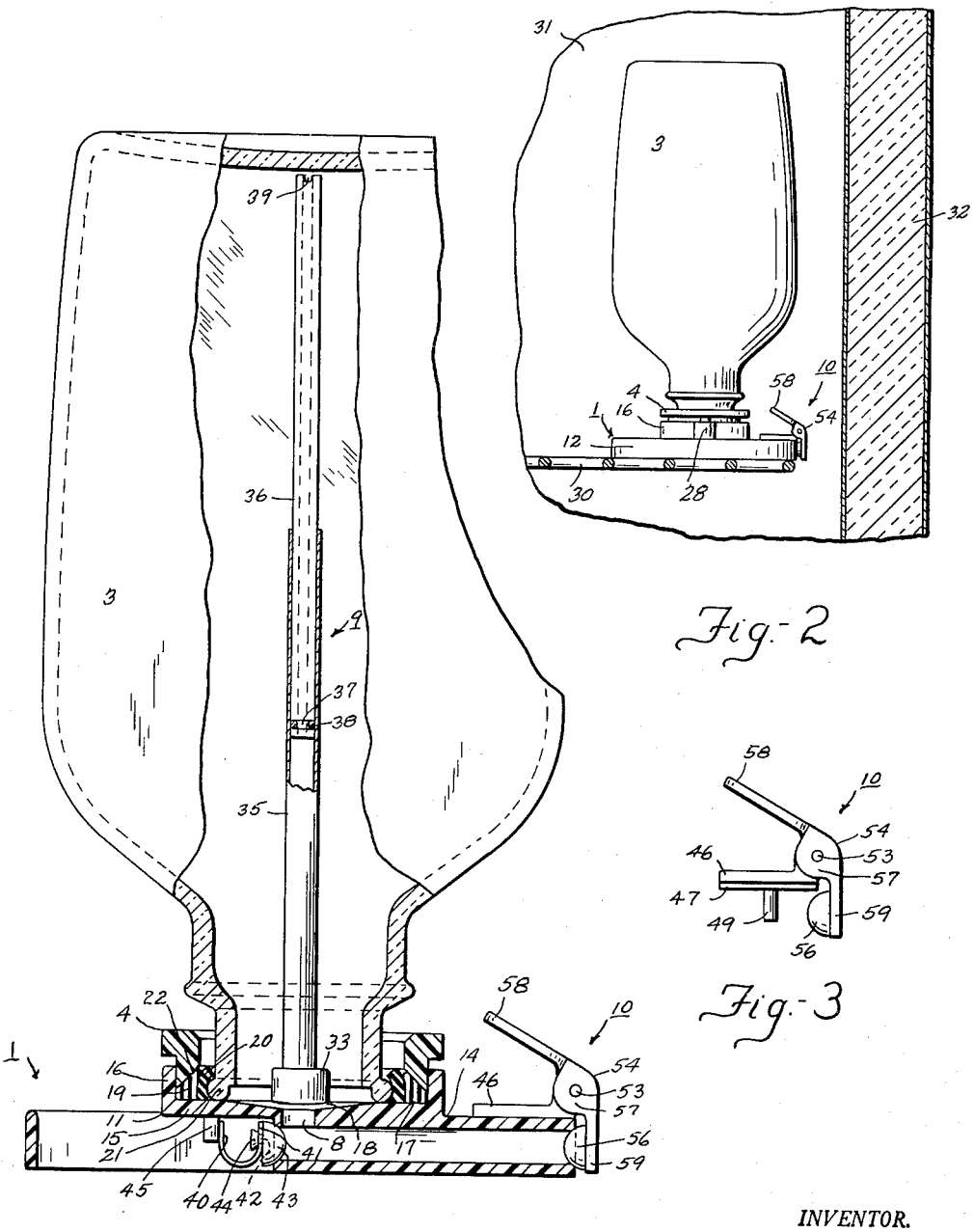
FIGURE 1 is a vertical section taken through the supporting assembly substantially on line 1—1 of FIGURE 4, with a container, partially in section, mounted on the device.
FIGURE 2 is a view, on a reduced scale, showing the structure illustrated in FIGURE 1 disposed for use on the shelf of a refrigerator.
FIGURE 3 is an elevational side view of the control device or subassembly which is adapted for attachment to the support of the dispensing device in a unique way for controlling the flow of liquid and air through the passages.

The supporting assembly or dispensing device embodying the subject invention may be designed and constructed in various ways but as exemplified in the drawings includes, among other things, a support or base generally designated 1 provided with a socket 2 for receiving the reduced end portion of a container 3, a clamping ring 4 for detachably holding the container in the socket, a pair of passages 5 and 6 provided in the support, a plug unit 7 for normally closing the inner ends of the passages, an opening 8 establishing communication between the socket and passage 5 so that liquid in the container may be discharged from this passage, a venting device generally designated 9 communicating with the interior of the container above the level of the liquid and the passage 6 so that air may be admitted to the container through this passage and venting device, and a control device, generally designated 10, located adjacent the outer ends of the passages 5 and 6 for respectively controlling the flow of liquid and air therethrough.

The support is preferably made round and of a size to stabilize the position of the container, such as a bottle, when secured thereto. More particularly, the support is preferably moulded from some desirable plastic material, such as "Tyril" No. 767, which possesses the properties above referred to. The support is formed to provide a central body portion 11 and an outer annular or ring portion 12 joined to the body portion by a plurality of four radial portions 13 and an enlarged radial portion 14 as clearly shown in FIGURE 4.

Figure 6:
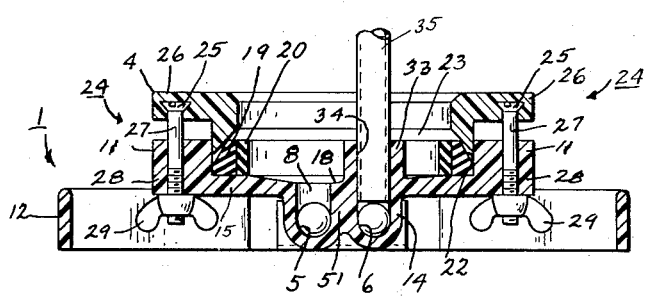
FIGURE 6 is a vertical section taken substantaally on line 6—6 of FIGURE 4.
Figure 10:
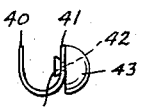
FIGURE 10 is an elevational side view of the plug unit, above referred to, which serves to normally close the inner ends of the passages.

The central body portion 11 at its upper side is formed to provide the annular socket 2 which is defined by a base wall 15 and a vertical side wall 16. The base wall is preferably formed to provide a horizontal seat or surface 17 and a concave surface 18 which is interrupted at its center by the opening 8 to establish communication between the socket and/or interior of the container and the passage 5. Sealing means preferably in the form of an outer annular gasket 19 and an inner annular gasket 20 are seated on the horizontal seat 17 of the socket with the outer gasket 19 engaging the side wall 16 of the socket and the inner gasket 20 engaging or embracing a lip or bead 21 formed on the reduced end of the container as shown in FIGURE 1. The outer gasket is preferably provided with a bevelled cam surface 22 as shown in FIGURE 6. The clamping ring 4 includes a portion which extends into the socket and has a bevelled cam surface 23 for engaging the bevel 22 on the outer gasket 19 and serves to force it against the seat 17 of the socket and cause the inner gasket to firmly embrace the lip 21 of the container as depicted. The outer gasket when compressed by the clamping ring also serves to force the inner gasket and the lip 21 against the seat 17 so as to firmly hold and seal the reduced end of the container in the socket when the ring is clamped in place by a pair of bolts generally designated 24 or equivalent means. It will be noted that the bevel 22 on the outer gasket is preferably disposed at a greater angle than the bevel on the ring in order to facilitate camming or compressing the gaskets into proper relationship with respect to the reduced end of the container and socket. The bolts include heads 25 which may be moulded in ears 26 formed on the clamping ring 4, threaded shanks 27 which are adapted to extend through holes provided therefor in ears 28 formed on the body portion 11, and wing nuts 29 are carried by the shanks for detachably clamping the ring in place. It will be noted that the wing nuts are disposed within the confines of the support and do not engage a mounting therefor, such as a shelf 30 in a refrigerator 31 having a door 32 as depicted in FIGURE 2.

Attention is directed to the fact that the two gaskets are preferably employed when a container of the particular size shown is mounted in the socket but when a container having a larger reduced end portion is to be mounted on the support the inner gasket may be omitted, in which event, only the outer gasket will be required. Obviously, an additional gasket may be utilized when a container having a smaller reduced end is to be mounted in the socket.

The device can be readily detachably connected to a container by merely loosening the bolts and fitting the device down over the reduced end of the container when the latter is in an upright position so that the reduced end is seated in the socket and then tightening the bolts to firmly seal the end in the socket, after which the device and container as a unit are inverted for placement on the shelf 30 as shown or upon some other mounting.

The large radial portion 14 of the support is made relatively wide and thick and a portion or portions thereof are disposed horizontally below the socket 2, with its inner extremity terminating a short distance beyond the opening 8 and its outer extremity terminating adjacent the periphery of the outer annular portion 12 of the support. The passages 5 and 6 are disposed in parallel relation and extend longitudinally through the radial portion and terminate at its extremities. The support is also formed to provide a tubular portion 33 extending upwardly from the base of the socket with an opening 34 therein which communicates with the passage 6 intermediate its length.

The venting assembly or device, generally designated 9, above referred to, includes a lower tube 35 which has its lower end seated in the tubular portion 33 of the support and an upper tube 36 which is preferably telescopically mounted in the lower tube. The fit between the lower tube and the tubular portion is such that the tube can be manually pressed tightly in place to provide a sealed connection and so that it can also be readily removed for cleaning. The inner end of the upper tube is preferably provided with an annular groove 37 in which is seated an O-ring or gasket 38 which engages the inner cylindrical surface of the lower tube to form a sealed slidable connection between the tubes. The upper end of the upper tube is preferably provided with a notch or notches 39 through which air may flow into the container when the upper end of this tube engages the bottom wall of the container. This venting assembly or device is unique and utilized by extending it to a length somewhat greater than the length of the container so that when the device is being fitted onto the container the upper tube, which is in a depending position during such fitting, will engage the bottom of the container and thereby automatically gauge its proper position for venting. This venting device also offers the advantage that it will automatically adjust itself for length when inverted into containers of different heights. It is important that the free end of the upper tube be in engagement or in close relationship to the bottom wall of the container when it is in an inverted position, otherwise the liquid would escape through the venting assembly when the control device is operated.

Figure 4:
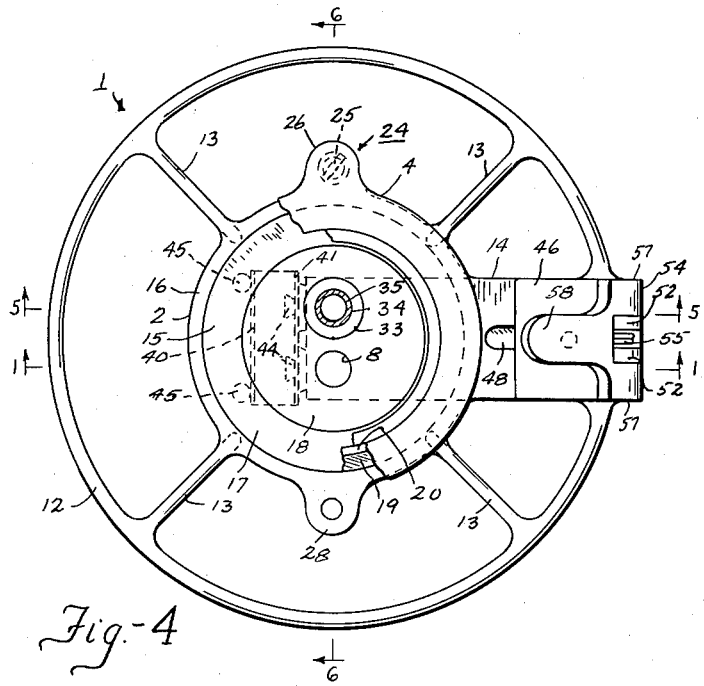
FIGURE 4 is a top view of the supporting assembly with portions broken away to illustrate certain details of design and construction.
Figure 7:
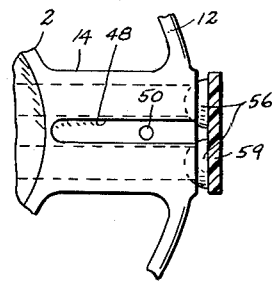
Figure 8:
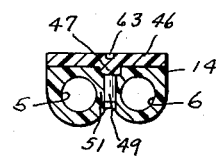
FIGURE 8 is a transverse section taken substantially on line 8—8 of FIGURE 5.
Figure 5:
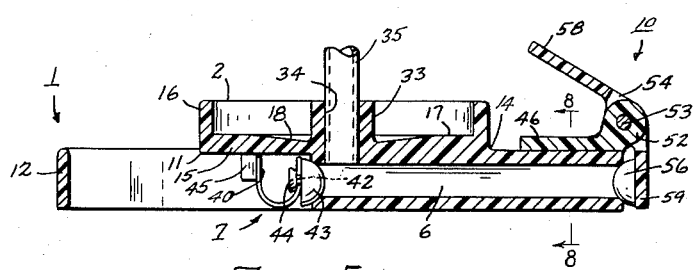
FIGURE 5 is a vertical section taken substantially on line 5—5 of FIGURE 4.
Figure 9:
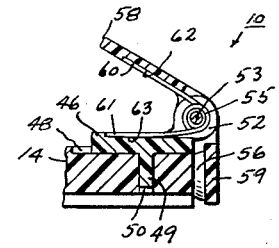
FIGURE 9 is a partial vertical section showing the mode of detachably connecting the control device to the support.

The plug unit 7, above referred to, preferably includes a channel like spring having a pair of side walls 40 and 41. The side wall 41 is provided with a pair of longitudinally spaced holes through which the neck portions 42 of a pair of resiliently flexible button-like plugs 43 are disposed. These plugs have convex surfaces which respectively fit into the inner seat formed ends of the passages 5 and 6 to close or seal same. These plugs have end portions 44 larger than the necks which can be crowded or forced through the holes in a manner to detachably and loosely interlock the plugs to the channel. The relationship of these plugs and channel is such that the plugs will readily adjust themselves with respect to the channel and the seats of the passages when the plug unit is being secured in place. The wall 40 of the channel is adapted to bear against the inner surfaces of a pair of abutment means, preferably in the form of lugs 45 depending from the base wall 15 of the socket as shown in FIGURES 1, 4 and 5. The unit is readily secured in place by merely inserting the unit into the space between the lugs 45 and the inner extremity of the radial portion 14 of the support so that the convex surfaces of the plugs are disposed in the passages and against the seats formed thereby and then pressing and flexing the wall 40 of the channel inwardly into engagement with the lugs as shown. The unit, when properly positioned, cannot be released until the unit is manually forced or pried outwardly.

The control device generally designated 10 will now be described. This device comprises an elongated base 46 having a lower longitudinal rib 47 which seats in a longitudinal groove or recess 48 provided in the upper side of the large radial portion 14 and a pin or projection 49 depending from the base at a location intermediate its ends for disposition in a hole 50 provided therefor in a wall or partition 51 between the passages 5 and 6. The outer end of the base is formed to provide a pair of axially spaced corresponding cylindrical bearings 52 offset upwardly and partially beyond the outer end of the base. The cylindrical bearings are provided with axial holes through which a pivot pin 53 extends.

The control device also includes a member 54, a spring 55 and a pair of button-like plugs or valves 56, like the plugs 43 above referred to, for selectively closing the outer ends of the passages, the material defining these outer ends forming seats for the valves. The member 54 is provided with a pair of ears 57 through which the pin 53 extends for pivotally connecting the member to the base 46. This member also includes a handle 58 and a depending portion 59, the latter of which carries the valves 56 in substantially the same manner that the plugs 43 are mounted. The depending portion 59 may also serve as a splash plate to direct some of the liquid downwardly as it is discharged from the passage 5. The handle 58 is preferably angularly disposed rearwardly away from the base in an out of the way position in order to prevent accidental operation thereof by engagement with the door 32 of the refrigerator when closed. The spring 55 includes a portion coiled about the pivot pin in the space between the bearings 52 and a pair of legs 60 and 61 which are respectively disposed in grooves 62 and 63 provided in the inner side of the handle 58 and in the upper side of the base 46 for normally urging the member 54 in a direction to hold the valves 56 in the outer ends and against the seats of the passages 5 and 6 for sealing the passages to respectively prevent the flow of liquid and air therethrough. The relationship of the control device with the support is such that it can be readily detachably connected to the support to afford access to the passages to facilitate cleaning and sterilization thereof. More specifically in this regard, the device can be easily assembled with the support by merely grasping the handle and base between the fingers of one's hand and pressing them toward one another a predetermined distance, inserting the pin 49 into the hole 50 until the rib 47 on the base is seated in the groove 48 in the upper side of the large radial portion 14, whereupon the handle is released to enable the valves 56 to adjust themselves in proper seating relationship to the outer ends of the passages 5 and 6 through the agency of the spring 55. That portion of the radial portion between the outer ends of the passages and the hole 50 is thus clamped between the pin and valves to hold the device operatively mounted to the support. It will be noted that since the handle extends rearwardly any downward manual pressure applied thereto assists in holding the device on the support when the valves are opened by such pressure. It should also be noted that the relationship and sizes of the passages, openings and tubes are such that just a sufficient quantity of air is admitted into the container to obtain a uniform flow and discharge of the liquid. In other words, there is a balanced relationship between the inflow of air and the outflow of liquid so that the latter will not gush or fountain out the passages.

Attention is directed to the fact that the support, clamping ring, and venting assembly are preferably constructed of "Tyril" or other suitable plastic material which is durable and will withstand high boiling temperatures during sterilization and that the plugs and valves are constructed of a material which will not deteriorate when sterilized. The metal components are also preferably constructed from a material or materials which will not rust or corrode.

Having thus described my invention, it is obvious that various modifications may be made in the same without departing from the spirit of the invention, and, therefore, I do not wish to be understood as limiting myself to the exact form, construction, arrangement and combination of parts herein shown and described.

I claim:

1. A dispensing device for a liquid comprising a support provided with an opening and a pair of passages disposed alongside one another and having open outer ends at one side of the device, a container for a liquid having an opening communicating with the opening in the support and one of the passages through which the liquid may be released, means for connecting the other passage with the interior of the container for venting air through the passage, means mounted on the support, and a pair of resilient valve means connected to the mounted means at a location exteriorly of the passages for opening and closing the said outer ends for respectively controlling the flow of liquid and air through said passages.

2. A dispensing device for a liquid comprising a support provided with a recess, a first passage, and an opening communicating with the recess and passage, annular gasket means disposed in the recess, means for compressing the gasket means for sealing a container for a liquid in the recess in communication with the opening so that the liquid may be released through the passage, said support also being provided with a second passage for communication with a tube adapted for disposition in the container so that air may flow into the container through the passage and tube, and means movable in a direction generally toward the opening for simultaneously closing the passages and movable in a reverse direction to open said passages.

3. A dispensing device for a liquid comprising a support provided with an opening and a pair of passages, a container for a liquid having an opening communicating with the opening in the support and one of the passages through which the liquid may be released, means for connecting the other passage with the interior of the container for venting air through the passage, a pair of resiliently removable plugs closing the inner ends of the passages, and a pair of valves adjacent the outer ends of the passages for respectively controlling the flow of liquid and air therethrough.

4. A dispensing device for a liquid comprising a support provided with a socket and a pair of passages, a container for a liquid having an open end portion seated in the socket, a clamping ring having a portion disposed in the socket for holding the end portion of the container in the socket, one of said passages communicating with the socket so that the liquid may flow therethrough from the container, means connecting the other passage with the interior of the container for venting air through this passage, and a pair of plug-like valves controlling the flow of liquid and air through said passages.

5. A dispensing device for a liquid comprising a support having a central body portion, an annular portion concentric with the body portion and a radial portion joining the body portion and annular portion, said body portion being provided with a socket and said radial portion with first and second passages, said first passage communicating with the socket so that when a container having liquid therein is placed in the socket the liquid can be discharged through this passage, a clamping device for holding the container in the socket, means for controlling the flow of the liquid through the first passage, said body portion also being provided with tubular means, a lower tube supported on said tubular means, an upper tube slidable on the lower tube so that its upper end may be disposed in a container above the level of a liquid when contained therein for admitting air into the container through the second passage and tubes, and means for controlling the flow of air through said second passage when the liquid is released through the first passage.

6. A dispensing device for a liquid comprising a support having a central body portion and a radial portion extending therefrom, said body portion being provided with a socket and said radial portion with first and second open ended passages, said first passage communicating with the socket so that when a container having liquid therein is placed in the socket the liquid can be discharged through this passage, means for controlling the flow of the liquid through the first passage, said body portion also being provided with tubular means extending upwardly from the socket, a tube slidable on the tubular means for disposition in a container with its upper end above the level of a liquid when contained therein for admitting air into the container through the second passage and tube, abutment means carried by the body portion, a member engaging said abutments and plug means on said member closing the inner ends of the passages, means for controlling the flow of air through said second passage when the liquid is released through the first passage, and said means for controlling the flow of liquid and air through the passages being simultaneously movable to normally close the outer ends of said passages.

7. In combination: a support provided with a passage and an opening disposed in a direction substantially transverse to the passage, a base member mounted on the support and having rigid therewith a projection disposed in the opening, a lever pivotally mounted on the member and provided with a valve disposed in and engaging a wall portion of said passage, and resilient means acting on the lever for developing a force thereon in said direction to hold the valve in the passage and the projection in the opening against accidental displacement.

8. In combination: a support provided with a pair of passages and an opening disposed in a direction substantially transverse to and between the passages, a base member mounted on the support and having rigid therewith a projection disposed in the opening, a lever pivotally mounted on the member and provided with a splash plate having a pair of valves attached thereto and disposed in and engaging wall portions of said passages, and resilient means acting on the lever for developing a force thereon in said direction to hold the valves in the passages and the projection in the opening against accidental displacement.

9. In combination: a support provided with a socket having a base wall for supporting the reduced portion of a container, gasket means disposed in the socket for surrounding the reduced end and provided with a cam surface, a clamping ring having a cylindrical portion for surrounding the reduced portion and an annular cam portion extending into the socket for engaging the cam surface on the gasket means, and means for pressing the clamping ring toward the support to cause the cam portion on the ring to engage the cam surface so that the gasket means will be forced in conforming relationship with the reduced portion of the container and against said base to obtain a fluid tight connection between the container and said socket.

10. In combination: a support provided with a socket for receiving the reduced portion of a container, gasket means disposed in the socket for surrounding the reduced end and provided with a cam surface, a clamping ring having a cylindrical portion for surrounding the reduced portion and an annular cam portion extending into the socket for engaging the cam surface on the gasket means, and means for pressing the clamping ring toward the support to cause the cam portion on the ring to engage the cam surface so that the gasket means will be forced in conforming relationship with the reduced portion of the container so as to resiliently mount the container and provide a fluid tight connection between the container and socket.

11. In combination: a support provided with a socket having a base wall for supporting an end of a container, gasket means disposed in the socket for surrounding the end and provided with a bearing surface, a clamping ring having a cylindrical portion for surrounding the end and an annular bearing portion extending into the socket for engaging the bearing surface on the gasket means, and means for pressing the clamping ring toward the support to cause the bearing portion on the ring to engage the bearing surface so that the gasket means will be forced into conforming relationship with the end of the container to obtain a fluid tight connection between the container and said socket.

12. In combination: a support provided with a socket for receiving an end of a container, gasket means disposed in the socket for surrounding the end and provided with a bearing surface, a clamping ring having a cylindrical portion for surrounding the end and an annular bearing portion extending into the socket for engaging the bearing surface on the gasket means, and means for pressing the clamping ring toward the support to cause the bearing portion on the ring to engage the bearing surface so that the gasket means will be forced into conforming relationship with the end of the container so as to resiliently mount the container and provide a fluid tight connection between the container and socket.

13. In combination: a support provided with a seat for supporting a container and a pair of passages having inner open ends and outer open ends, openings intersecting the passages and the seat for establishing communication between the passages and the interior of a container when the latter is mounted on the seat, sealing means for closing the inner ends of the passages, means for holding the sealing means in closing position, and means operable independently of said sealing means for closing and opening the outer ends of the passages.

References Cited in the file of this patent

UNITED STATES PATENTS

| | | |
|---|---|---|
| 238,052 | Ricker et al. | Feb. 22, 1881 |
| 705,018 | Bechtold | July 22, 1902 |
| 998,389 | Penick et al. | July 18, 1911 |
| 1,207,278 | Cordley | Dec. 5, 1916 |
| 1,326,253 | Cordley et al. | Dec. 30, 1919 |
| 1,368,703 | Czerney | Feb. 15, 1921 |
| 1,719,260 | Cordley et al. | July 2, 1929 |
| 1,743,293 | Toft | Jan. 14, 1930 |
| 1,862,088 | Jones et al. | June 7, 1932 |
| 2,020,884 | Cabrera | Nov. 12, 1935 |
| 2,369,721 | Delzer | Feb. 20, 1945 |
| 2,387,699 | Bates | Oct. 23, 1945 |
| 2,445,101 | Bailey | July 13, 1948 |
| 2,551,842 | Kirchner | May 8, 1951 |
| 2,757,688 | Klingler | Aug. 7, 1956 |
| 2,778,545 | Sapia | Jan. 22, 1957 |
| 2,827,921 | Sherman et al. | Mar. 25, 1958 |